US011356369B1

(12) United States Patent
Loganathan et al.

(10) Patent No.: US 11,356,369 B1
(45) Date of Patent: Jun. 7, 2022

(54) BORDER GATEWAY PROTOCOL UPDATE PACKING FOR A DISTRIBUTED ROUTING INFORMATION BASE

(71) Applicant: Juniper Networks, Inc., Sunnyvale, CA (US)

(72) Inventors: Jaihari V. Loganathan, Cupertino, CA (US); Ashutosh K. Grewal, Sunnyvale, CA (US); Sanjay Khanna, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 34 days.

(21) Appl. No.: 16/836,436

(22) Filed: Mar. 31, 2020

(51) Int. Cl.
*H04L 45/7453* (2022.01)
*H04L 69/325* (2022.01)
*H04L 69/28* (2022.01)
*H04L 45/02* (2022.01)
*H04L 45/748* (2022.01)

(52) U.S. Cl.
CPC .......... *H04L 45/7453* (2013.01); *H04L 45/02* (2013.01); *H04L 69/28* (2013.01); *H04L 69/325* (2013.01); *H04L 45/748* (2013.01)

(58) Field of Classification Search
CPC ... H04L 45/02; H04L 45/748; H04L 45/7453; H04L 69/28; H04L 69/325
See application file for complete search history.

(56) References Cited

U.S. PATENT DOCUMENTS 6,392,997 B1 * 5/2002 Chen ................ H04L 45/02
370/252

6,938,095 B2   8/2005 Basturk et al.
(Continued)

FOREIGN PATENT DOCUMENTS

CN    101741705 A    6/2010
CN    102394809 A    3/2012
(Continued)

OTHER PUBLICATIONS

Brands et al., "Parallelization of BGP for route server functionality—A protocol and implementation study," amsix Amsterdam Internet Exchange, MSc Research Project System and Network Engineering, Aug. 4, 2017, 51 pp.
(Continued)

*Primary Examiner* — Melanie Jagannathan
(74) *Attorney, Agent, or Firm* — Shumaker & Sieffert, P.A.

(57) ABSTRACT

In general, the disclosure describes techniques for distributing processing of routes among multiple execution threads of a network device. In some examples, a method includes partitioning a routing information base (RIB) into a plurality of RIB partitions, assigning a route processing thread to each RIB partition, processing BGP routing protocol messages at each of the route processing threads, and receiving, at a BGP update thread serving a BGP peer group, from two or more of the route processing threads, route update information for routes to be advertised. The route update information includes a BGP route tuple having a network prefix value and a pointer to an outgoing attribute. The method further includes collecting, based on the BGP route tuples, route update information for routes having the same outgoing attribute and constructing a BGP update message from the collected route update information.

20 Claims, 5 Drawing Sheets

(56) References Cited

U.S. PATENT DOCUMENTS

| | | |
|---|---|---|
| 7,184,437 B1 | 2/2007 | Cole et al. |
| 7,245,619 B1 | 7/2007 | Guan et al. |
| 7,334,048 B1* | 2/2008 | Guan ............... H04L 45/02 709/223 |
| 7,359,393 B1* | 4/2008 | Nalawade ............ H04L 45/02 370/401 |
| 7,499,459 B1* | 3/2009 | Scudder ............... H04L 45/02 370/389 |
| 7,558,877 B1* | 7/2009 | Fedyk ................. H04L 63/20 709/242 |
| 7,675,912 B1* | 3/2010 | Ward ................ H04L 45/026 370/392 |
| 8,463,887 B2 | 6/2013 | Rajan et al. |
| 8,937,961 B1 | 1/2015 | Vairavakkalai |
| 10,091,049 B2 | 10/2018 | Giacomoni et al. |
| 10,296,393 B2 | 5/2019 | Nandan et al. |
| 10,642,650 B2 | 5/2020 | Wang et al. |
| 10,761,993 B2 | 9/2020 | Li et al. |
| 2003/0110289 A1 | 6/2003 | Kamboh et al. |
| 2004/0160969 A1 | 8/2004 | Moon et al. |
| 2005/0074003 A1* | 4/2005 | Ball ................... H04L 45/04 370/389 |
| 2005/0135256 A1* | 6/2005 | Ball ................... H04L 45/56 370/238 |
| 2005/0169281 A1 | 8/2005 | Ko et al. |
| 2006/0233181 A1* | 10/2006 | Raszuk ............... H04L 45/02 370/401 |
| 2007/0064698 A1* | 3/2007 | Appanna .............. H04L 45/28 370/392 |
| 2009/0182896 A1* | 7/2009 | Patterson ............. H04L 45/02 709/241 |
| 2011/0242991 A1 | 10/2011 | Zhang et al. |
| 2012/0063460 A1* | 3/2012 | Hallivuori ............ H04L 45/02 370/392 |
| 2012/0263049 A1* | 10/2012 | Venkatachalapathy ............... H04L 41/12 370/252 |
| 2014/0075048 A1* | 3/2014 | Yuksel ................ H04L 45/28 709/242 |
| 2016/0352619 A1 | 12/2016 | Gattani |
| 2017/0207963 A1* | 7/2017 | Mehta ............... H04L 61/6022 |
| 2019/0179668 A1* | 6/2019 | Wang ................ G06F 9/4881 |
| 2021/0067463 A1* | 3/2021 | Mukhopadhyay .... H04L 49/251 |
| 2021/0120109 A1* | 4/2021 | Ranpise ............ H04L 69/324 |
| 2021/0243111 A1* | 8/2021 | Dutta ................. H04L 12/08 |

FOREIGN PATENT DOCUMENTS

| | | |
|---|---|---|
| CN | 102752198 A | 10/2012 |
| CN | 105812276 A | 7/2016 |
| CN | 107343302 A | 11/2017 |
| WO | 2012083704 A1 | 6/2012 |

OTHER PUBLICATIONS

Ishida, "GoBGP: yet another OSS BGPd," NTT Software Innovation Center, RIPE-71, retrieved from https://ripe71.ripe.net/presentations/135-RIPE71_GoBGP.pdf, Nov. 2015, 26 pp.

Lei et al., "An Improved Parallel Access Technology on Routing Table for Threaded BGP," 2009 15th International Conference on Parallel and Distributed Systems, Dec. 1, 2009, 7 pp.

Liu et al., "MR-PBGP: A Multi-Root Tree Model for Parallel BGP," 2012 IEEE 14th International Conference on High Performance Computing and Communications, Jun. 25, 2012, 8 pp.

Schweizer et al., "Evaluating the Cost of Atomic Operations on Modern Architectures," published by the Institute of Electrical and Electronics Engineers (IEEE) on Mar. 10, 2016, 12 pp.

Prosecution History from U.S. Appl. No. 15/841,023, dated Oct. 2, 2019 through Jan. 27, 2020, 37 pp.

U.S. Appl. No. 15/930,171, filed May 12, 2020, entitled "Lockless Management of Immutable Objects by Multi-Threaded Processes", Juniper Networks Inc., inventors Loganathan et al.

* cited by examiner

BORDER GATEWAY PROTOCOL UPDATE PACKING FOR A DISTRIBUTED ROUTING INFORMATION BASE

TECHNICAL FIELD

This disclosure generally relates to computer networks and, more specifically, to network routing protocol processing.

BACKGROUND

Packet-based networks, such as the Internet, communicate data by dividing the data into small blocks called packets, which are individually routed across the network from a source device to a destination device. Routing devices within the network, such as routers, maintain routing information that describes routes for the network. Such devices may use the routing information to generate forwarding information, which is used by the routing devices to relay packet flows through the network and, more particularly, to relay packet flows to a next hop. When receiving an incoming packet, the router examines information within the packet to identify the destination for the packet. Based on the destination, the router forwards the packet in accordance with the forwarding information.

Computer networks, such as the Internet, may include distributed sets of routers that exchange routing information according to a defined routing protocol. Border Gateway Protocol (BGP), the Intermediate System to Intermediate System (IS-IS) Protocol, and the Open Shortest Path First (OSPF) Protocol are representative examples of defined routing protocols. When two routers initially connect, the routers exchange routing information and generate forwarding information from the exchanged routing information. Particularly, the two routers initiate a routing communication "session" via which they exchange routing information using routing protocol messages according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or to inform other routers that some routes are no longer available.

An autonomous system (AS) is a collection of networks under a single administrative domain. Collections of interconnected autonomous systems, such as the internet, use BGP to route data packets between and within autonomous systems based on addressing information within the data packets. A routing protocol route advertisement, such as a BGP UPDATE message, may be used to advertise one or more routes for network prefixes reachable via the network.

A routing domain, such as a BGP network, may include one or more routers, route reflectors, nodes, and endpoint devices (e.g., servers, printers, and computers). Some of the routers within the routing domain may be grouped together into redundant clusters. Each router within the routing domain typically forwards data packets according to routes stored at the router and the destination address of the data packets. Route reflectors, such as BGP route reflectors, peer with other routers to receive and advertise routes but typically do not forward packets.

SUMMARY

In general, the disclosure describes techniques for distributing processing of routes among multiple execution threads of a network device. For example, a network device, such as a router or route reflector, receives routes from multiple peer devices, each of the routes specifying reachability information for a network prefix. The routes may be received and represented in part as one or more network prefixes included in a route advertisement, such as a Border Gateway Protocol (BGP) UPDATE message. A software thread executing on a processing core of the network device initially processes a received route to identify one of a plurality of route processing threads executing on the network device with which to process the route. Such identification may include applying a hash function to a network prefix for the route. The thread then signals the identified route processing thread to process and store the route. Example processing steps performed by a route processing thread for a route received in a routing protocol message may include, for instance, receiving and parsing the received routing protocol message, creating a new route, resolving a next hop for the route, preparing a new routing protocol message for advertising the route with the resolved next hop (for instance), and sending the new routing protocol message to one or more routing protocols peers of the network device.

Techniques for facilitating consistency among the route processing threads as respects the overall routing information state of the network device are also described. Such techniques may include facilitating route resolution for the distributed routes stored by the one or more route processing threads, route aggregation, and route display functions among the route processing threads.

The techniques may provide one or more advantages. For example, the techniques may improve parallelization for inbound route processing within a network device by distributing route processing among multiple route processing software threads according to network prefixes associated with the advertised routes. This may reduce the latency for processing any given route received by the network device and/or may reduce the overall route convergence time for the network device.

In one example, route processing threads send compact advertisement information for routes to be advertised to a BGP update thread serving a BGP peer group. The BGP update thread constructs a BGP update message from the compact advertisement information. In one such example, the BGP update thread collects the route update information from routes having the same outgoing attribute from the compact advertisement information received from two or more route processing threads. Such an approach allows a BGP update thread serving a given BGP peer group to pack the route update information of routes having the same attributes (potentially belonging to different route processing threads) in the same outbound BGP update message. This reduces the number of updates to be advertised and thus helps improve convergence.

In one example, a method of constructing Border Gateway Protocol (BGP) updates includes partitioning a routing information base (RIB) into a plurality of RIB partitions, assigning a route processing thread to each RIB partition, wherein the route processing thread is a software execution thread of a network device, processing BGP routing protocol messages at each of the route processing threads, wherein each BGP routing protocol message includes a network prefix and wherein processing includes generating, at one or more of the route processing threads, route update information for each route to be updated, wherein the route update information includes a BGP route tuple having a network prefix value and a pointer to an outgoing attribute, receiving, at a BGP update thread serving a BGP peer group, from two or more of the route processing threads, the route update information for routes to be advertised, the route update information including network prefixes associated with the BGP peer group, collecting, based on the BGP route tuples, route update information for routes having the same outgoing attribute, and constructing, at the BGP update thread, a BGP update message from the collected route update information.

In one example, a network device includes a network interface card; and at least one hardware-based processor comprising a plurality of processing cores for executing a plurality of execution threads for at least one routing protocol process, the at least one hardware-based processor configured to partition a routing information base (RIB) into a plurality of RIB partitions, assign a route processing thread to each RIB partition, wherein the route processing thread is a software execution thread of one of the at least one hardware-based processors, process Border Gateway Protocol (BGP) routing protocol messages at each of the route processing threads, wherein each BGP routing protocol message includes a network prefix and wherein processing includes generating, at one or more of the route processing threads, route update information for route to be updated, wherein the route update information includes a BGP route tuple having a network prefix value and a pointer to an outgoing attribute, receive, at a BGP update thread serving a BGP peer group, from two or more of the route processing threads, the route update information for routes to be advertised, the route update information including network prefixes associated with the BGP peer group, collect, based on the BGP route tuples, route update information for routes having the same outgoing attribute, and construct, at the BGP update thread, a BGP update message from the collected route update information.

In one example, a non-transitory computer-readable medium includes instructions that, when executed, cause one or more hardware-based processors of one or more network devices to perform operations comprising partitioning a routing information base (RIB) into a plurality of RIB partitions, assigning a route processing thread to each RIB partition, wherein the route processing thread is a software execution thread of one or more of the hardware-based processors of the one or more network devices, processing Border Gateway Protocol (BGP) routing protocol messages at each of the route processing threads, wherein each BGP routing protocol message includes a network prefix and wherein processing includes generating, at one or more of the route processing threads, route update information for each route to be updated, wherein the route update information includes a BGP route tuple having a network prefix value and a pointer to an outgoing attribute, receiving, at a BGP update thread serving a BGP peer group, from two or more of the route processing threads, the route update information for routes to be advertised, the route update information including network prefixes associated with the BGP peer group, collecting, based on the BGP route tuples, route update information for routes having the same outgoing attribute, and constructing, at the BGP update thread, a BGP update message from the collected route update information.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
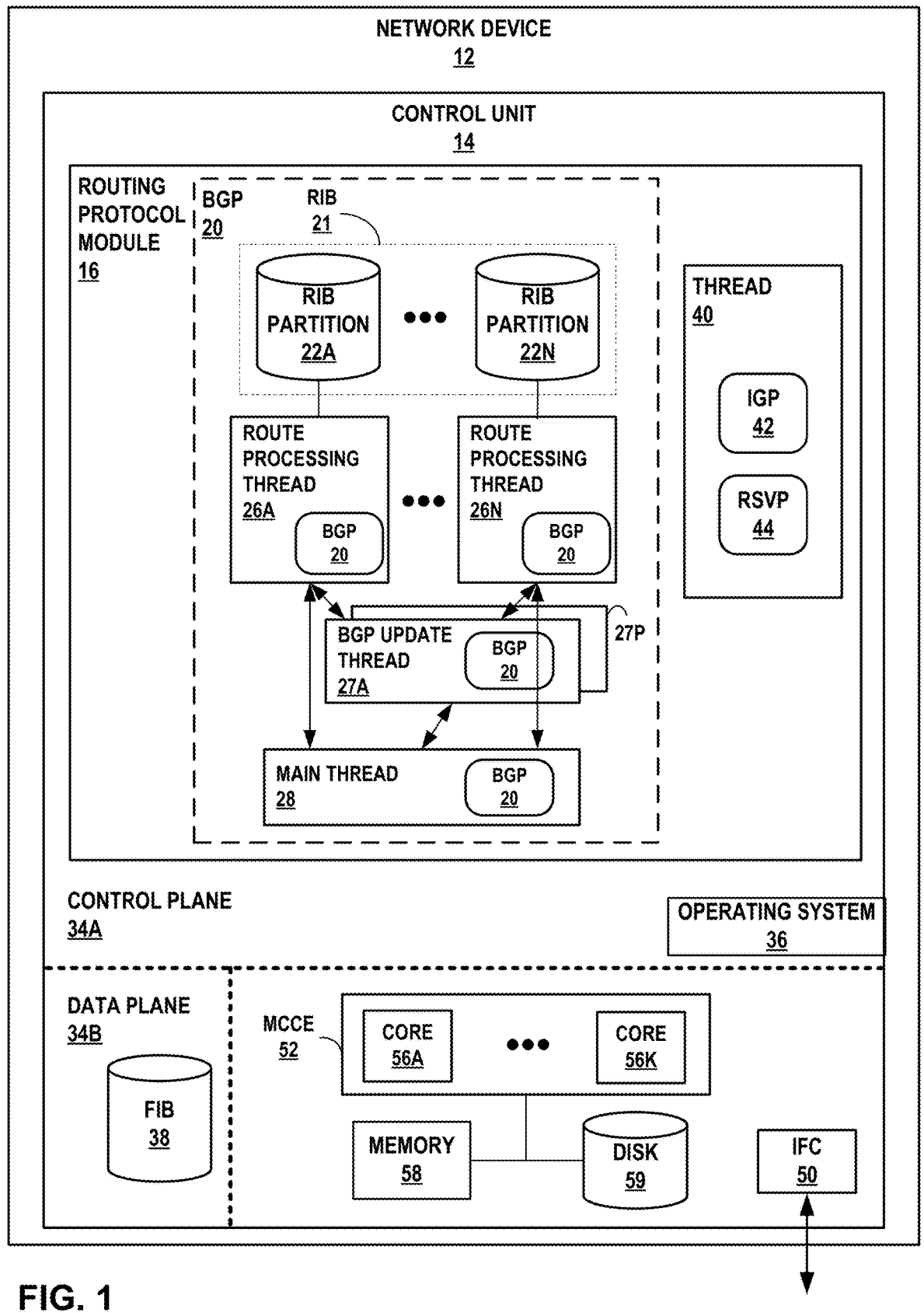
FIG. 1 is a block diagram illustrating an example network device configured to execute parallel route processing threads, according to techniques of this disclosure.

FIG. 1 is a block diagram illustrating an example network device configured to execute parallel route processing threads according to techniques of this disclosure. Network device 12 may represent a router, route reflector, or other network device that is connected via one or more network links to other network devices that advertise routes to the network device 12. For example, network device 12 may be a core or edge router of a service provider network, enterprise network, edge network such as a data center network, an access router, a controller, a real or virtual server or other compute node configured to execute a route or route reflector, or a route reflector of any of the aforementioned networks or other network.

Network device 12 includes a multi-core computing environment (MCCE) 52 that includes a plurality of processors or processing cores 56A-56K (collectively, "cores 56"). Multi-core computing environment 52 may include any number of processors and any number of hardware cores from, for example, four to thousands. Each of cores 56 includes an independent execution unit to perform instructions that conform to an instruction set architecture for the core. Cores 56 may each be implemented as separate integrated circuits (ICs) or may be combined within one or more multi-core processors (or "many-core" processors) that are each implemented using a single IC (i.e., a chip multiprocessor), package, or die. Alternatively, or in addition, multi-core computing environment 52 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. As used herein, "processor" or "processing circuitry" may refer to one or more cores 56.

Memory 58 represents a main memory. Examples of memory 58 include non-transitory computer-readable mediums including memory such as random-access memory (RAM) (including various forms of dynamic RAM (DRAM), e.g., DDR2 SDRAM and DDR3), static RAM (SRAM), and Flash memory. Storage disk 59 is a form of fixed or removable storage medium that can be used to carry or store desired program code and program data in the form of instructions or data structures and that can be accessed by a processor such as core 56. In one example approach, storage device 59 may include volatile or non-volatile memory that stores instructions to cause the one or more cores 56 to perform techniques described herein. Examples of storage device 59 include a disk drive and/or an optical drive.

Multi-core computing environment 52, memory 58, and storage device 59 provide a hardware operating environment for a control unit 14 that performs control plane 34A and, in some cases, forwarding or data plane 34B functionality for network device 12. That is, in this example, control unit 14 is divided into two logical or physical "planes" to include a first control or routing plane 34A ("control plane 34A") and a second data or forwarding plane 34B ("data plane 34B"). That is, control unit 14 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 34A defines control plane functionality of network device 12. Control plane 34A manages and controls the behavior of network device 12, including the behavior of data plane 34B. Operating system 36 of control plane 34A provides a run-time environment for multiple different processes each made up of one or more execution threads. Operating system 36 may represent, for example, a UNIX operating system derivative such as Linux or Berkeley Software Distribution (BSD). Operating system 36 may offer libraries and drivers by which processes may interact with data plane 34B, for example, or other hardware of network device 12, including a filesystem and main memory for network device 12. Libraries and drivers of operating system 36 may include Application Programming Interfaces (APIs) that provide standard interfaces for developers to invoke the functionality of operating system 36 and network device 12 exposed by the libraries and drivers. Operating system 36 supports multi-threading for multiple software execution threads. Although described with respect to a network device 12 that includes a data plane 34B for forwarding packets in accordance with routing information including received routes, the techniques of this disclosure are applicable to network devices, such as controllers and route reflectors, that perform control plane 34A operations but may perform no or limited data plane 34B operations with respect to forwarding packets in accordance with routing information including received routes. In some cases, the control plane 34A and data plane 34B are not co-located within a single network device chassis but are distributed among multiple devices. For example, examples of network device 12 that are controllers may perform the techniques described herein with respect to route processing and may program, using software-defined network (SDN) techniques, one or more network nodes with forwarding information to implement the routes within the network.

Network device 12 includes one or more network interface card(s) 50 coupled to control unit 14 via a bus or other communication links. Interface card(s) include one or more ports configured to receive network cables used to couple network device 12 to network devices that advertise routes according to a routing protocol.

Control unit 14 is configured to execute a routing protocol module 16, which represents one or more computer processes for managing routing information of network device 12 by, e.g., executing routing protocols to advertise and receive routes, processing received routes to resolve next hops, and in some cases generating forwarding information. In the example of network device 12, forwarding information for the network device 12 is represented by forwarding information base (FIB) 38 of data plane 34B. Other operations performed by routing protocol module 16 may include computing label-switched paths (LSPs), signaling LSPs using an LSP signaling protocol, managing routing instances, managing layer 2 and layer 3 virtual private networks, and managing multicast groups and computing multicast distribution trees for multicast traffic, for instance.

Routing protocol module 16 includes software execution threads 26, 27, 28, and 40, each of which may execute on a different one of cores 56. In one example approach, threads 26, 27, 28, and 40 are scheduled by operating system 36 for execution by cores 56 according to a multi-threading scheduling scheme, e.g., using time-slicing, and routing protocol module 16 may represent an overall software process having the multiple software execution threads.

As one example, one or more protocol threads 40 execute one or more protocols such as interior gateway protocol (IGP) 42 and resource reservation protocol (RSVP) 44. IGPs for IGP 42 may include open shortest path first (OSPF), intermediate system to intermediate system (IS-IS), and routing information protocol (RIP), for instance. Other protocols (not shown) that may be executed by thread 40 may include signaling and control protocols for L3VPN, L2VPN, Ethernet VPN, Multicast VPN, Virtual Private LAN Service, Protocol Independent Multicast, Label Distribution Protocol, for instance.

Although techniques of this disclosure are described primarily with respect to the Border Gateway Protocol (BGP), the techniques are similarly applicable to processing routing information received in routing protocol messages according to other layer 3 routing protocols, as well as interior gateway protocols in which route resolution is required, such as any distance-vector protocol (e.g., RIP).

Routing protocol module 16 includes one or more Border Gateway Protocol (BGP) input-output (IO) thread(s) (shown in FIG. 1 as BGP update threads 27A-27P (collectively, "BGP update threads 27")) that receive and output routing protocol messages for a routing protocol, BGP 20 in this example. BGP update thread(s) 27 may manage a receipt queue of routing protocol messages received by network device 12 at IFC(s) 50 for processing by main thread 28, by route processing threads 26A-26N (collectively, "route processing threads 26") and by the BGP update threads 27A-27P (collectively, "BGP update threads 27"). BGP update thread(s) 27 may manage an output queue of routing protocol messages generated by BGP update thread(s) 27 from route update information received from route processing threads 26 for output via IFC(s) 50. In one example approach, the number of route processing threads 26, N, and BGP update threads 27, P, may be configurable by a user or operator of network device 12. Furthermore, routing protocol module 16 may include additional one or more threads (not shown) for managing and/or exchanging routes with the kernel routing table (also not shown). Also, in some examples, main thread 28 and BGP update threads 27 may be combined as a single thread, or as a set of two or more threads that perform similar operations for the BGP protocol. Similarly, in some examples, main thread 28 and protocol thread(s) 40 may be combined as a single thread, or as a set of two or more threads that perform similar operations for a common set of protocols. In one example approach, as shown in FIG. 1, main thread 28 may communicate directly with route processing threads 26 and with BGP update threads 27 to exchange information such as route update information generated by main thread 28, peer state transitions, configuration synchronization information and query statistics. In one such example approach, the route update information from main thread 28 may include information such as an advertising prefix, metrics and peers to which device 12 advertises.

As shown in FIG. 1, routing information base (RIB) 21 is partitioned into two or more RIB partitions 22A-22N, (collectively, "RIB partitions 22"), with each RIB partition 22 associated with one of the route processing threads 26. Route processing threads 26 manage respective, separate partitions of routing information in the form of routing information base (RIB) partitions 22A-22N, with each of the RIB partitions 22 storing a different portion of the routes that make up the overall RIB 21 for network device 12.

In accordance with techniques described herein, routing protocol module 16 includes multiple, concurrently executing, route processing threads 26 for distributing and performing distributed processing of routes received in routing protocol messages by network device 12. In general, a routing protocol message advertises one or more routes, each route made up of a destination network prefix and a next hop router (or more simply, "next hop") of the network for reaching the destination network prefix. For example, a BGP UPDATE message is an example of a routing protocol message and includes a NEXT HOP path attribute that specifies a next hop for one or more destination network prefixes included in respective network layer reachability information (NRLI) of the BGP UPDATE message. The destination network prefix and the next hop may be expressed as addresses in the Internet Protocol (e.g., IPv4, IPv6) address space. A next hop is an example of forwarding information for a network prefix. Routing protocol module 16 is described further in U.S. patent application Ser. No. 15/841,023, filed Dec. 13, 2017, the description of which is incorporated by reference.

Route processing threads 26 may be substantially similar in that each of routing processing threads 26 separately executes similar operations for processing routing protocol messages received by network device 12. Examples of such operations are described in further detail with respect to FIG. 2. Operating system 36 may schedule two or more route processing threads 26 to execute at least partially concurrently on respective cores 56 such that multiple route processing threads 26 may execute at least partially in parallel to process respective routing protocol messages concurrently. In addition, although the techniques are described primarily with respect to a single multi-threaded process (i.e., routing protocol module 16), the techniques may be applied using multiple threads executing within different processes located on a single network device or distributed among multiple different network devices. For example, a BGP update thread 27 may execute on a load balancing device to distribute received routes among multiple separate network devices each configured to execute one or more of routing processing threads 26 to process routes in the manner described herein.

As noted above, route processing threads 26 manage respective, separate partitions of routing information in the form of routing information base (RIB) partitions 22A-22N. In the example of FIG. 1, in which routing protocol module 16 processes BGP UPDATE messages, each of threads 26, 27 and 28 execute at least a subset of the BGP routing protocol operations. For example, route processing threads 26 may process the received BGP UPDATE messages, resolve next hops for routes received in the BGP UPDATE messages, and transmit route update information to BGP update thread 27, where the route update information is used by the BGP update thread 27 to generate a BGP UPDATE message and to transmit the BGP UPDATE message to other network devices.

Network device 12 receives, via IFC(s) 50, routing protocol messages and, in one example approach, control plane 34A processes the routing protocol messages as control plane messages. In particular, routing protocol module 16 processes the routing protocol messages. In one such example approach, for a routing protocol message received by network device 12, one of BGP update thread(s) 27 initially processes the routing protocol message, which includes a route, to identify one of the route processing threads 26 with which to process the route. For example, a BGP update thread 27 may apply a hash function to a network prefix for the route, where a number of hash buckets for the hash function is configured to be the number of route processing threads 26 and each hash bucket corresponds to the assigned route processing thread 26 for routes hashed to the hash bucket. The BGP update thread 27 may apply the hash function to select bits of the network prefix in some cases, and in some cases BGP update thread 27 may apply the hash function to other attributes of a received routing protocol message in addition or in the alternative to the network prefix. As another example, the BGP update thread 27 may apply another operation to identify one of the route processing threads 26 with which to process the route, such as using bit patterns applied to bits of a network prefix, the masked values of which being mapped to the route processing threads 26. In such cases, BGP update thread 27 stores a data structure that maps each result value for application of bit patterns to one of route processing threads 26.

The BGP update thread 27 then signals the identified route processing thread 26 to process the route. For example, BGP update thread 27 may add the route or the full routing protocol message to a queue of routing protocol module 16 shared by the various route processing threads 26 but processed by the identified route processing thread 26 for the route.

One disadvantage of RIB partitioning is that partitioning may increase the amount of time required to advertise BGP routes. For example, in a RIB that is not partitioned, updates corresponding to particular outgoing attributes are sent in the same BGP update message. That is, if the prefixes P1, P2, P3, and P4 to be updated share the same attribute A1, BGP route update information for prefixes P1, P2, P3, and P4 go in same BGP update message. Similarly, if the prefixes P5, P6, P7, and P8 to be updated share the same attribute A2, BGP route update information for prefixes P5, P6, P7, and P8 go in same BGP update message.

In a partitioned RIB, prefixes are distributed across the RIB partitions 22. Given the scenario discussed in the previous paragraph, for instance, in a RIB 21 having two RIB partitions 22A and 22B, where the prefixes are distributed as P1, P3, P5 and P7 to the first partition and P2, P4, P6 and P8 to the second partition, each RIB partition 22 generates two BGP update messages. The BGP update messages for RIB partition 22A include a BGP update for P1 and P3 and a BGP update for P5 and P7, while the BGP update messages for RIB partition 22B include a BGP update for P2 and P4 and a BGP update for P6 and P8. That is, the number of BGP update messages needed has the potential to increase by a factor of P, where P is the number of partitions. The increased number of update messages may reduce or eliminate any gains due to concurrency. In addition, the increased number of update messages may have a negative impact on downstream routers, which incur the load of processing increased updates. The situation is not improved if updates are generated and then recombined elsewhere. Instead, in one example approach, BGP update threads 27 are used to address this issue.

As noted above, route processing threads 26 transmit route update information associated with prefixes to be updated that are stored within a RIB partition 22 associated with the respective route processing thread 26. In one example approach, route processing threads 26 transmit route update information associated with a given BGP peer group to a BGP update thread 27 serving the given BGP peer group. The BGP update thread 27 generates a BGP update message from the route update information received from the various route processing threads 26. In one example, BGP update thread 27 constructs each BGP update message to include route update information for prefixes having the same outgoing attribute, even if the route update information received is from two or more route processing threads 26. Such an approach allows a BGP update thread 27 serving a given BGP peer group to pack prefixes having the same attributes (potentially belonging to different route processing threads 26) in the same outbound BGP update message.

The techniques may provide one or more advantages. For example, the techniques may enable or improve parallelization for route processing within network device 12 by distributing route processing among the multiple route processing threads 26 by network prefix, rather than by route processing task or operation. This may reduce the latency for processing any given route received by the network device 12 and/or may reduce the overall route convergence time for the network device 12. In addition, the techniques described may improve parallelization for route processing within network device 12 by packing prefixes having the same attributes (potentially belonging to different route processing threads 26) in the same outbound update message. This approach reduces the number of BGP update messages transmitted and, thus, helps improve convergence.

Figure 2:
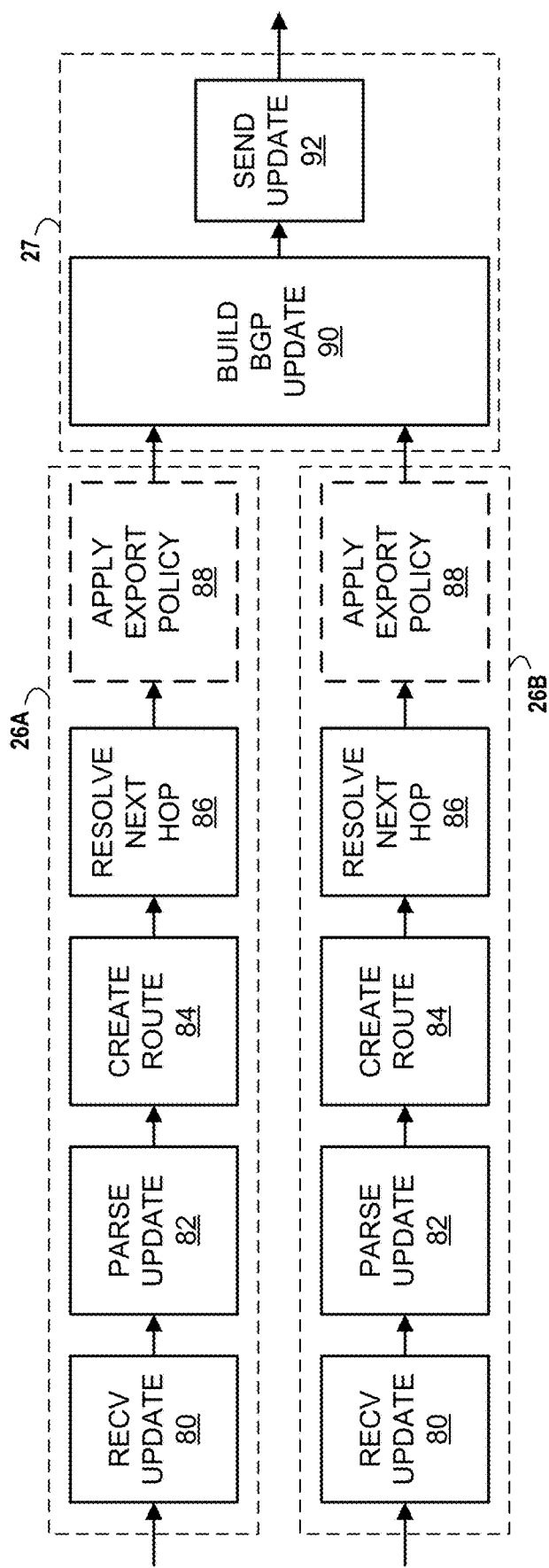
FIG. 2 is a conceptual diagram illustrating distributed, parallel route processing by multiple route processing threads according to techniques described in this disclosure.

FIG. 2 is a conceptual diagram illustrating distributed, parallel route processing by multiple route processing threads according to techniques described in this disclosure. The route processing is described with respect to network device 12 of FIG. 1. Each of route processing threads 26 of routing protocol module 16 separately performs one or more route processing tasks. The tasks may include, as examples, parsing the routing protocol message, generating a route from the routing protocol message (e.g., by associating a network prefix and next hop included therein), resolving the next hop for the generated route, enqueuing data for advertisement from the routing information base, and generating a new routing protocol advertisement to advertise the generated route. For example, for routing protocol messages that conform to BGP, each route processing thread 26 may receive a route update associated with a route to be stored in the RIB partition 22 that is assigned to the route processing thread 26 (80). For routes to be stored in RIB partition 22A, route processing thread 26A parses the route update (82), creates a route (84), and resolves the next hop (86). For routes to be stored in RIB partition 22B, route processing thread 26B parses the route update (82), creates a route (84), and resolves the next hop (86). In some examples, route processing threads 26A and 26B may also apply an export policy (88). Route processing thread 26 then transmits route update information associated with the route prefix to a BGP update thread 27. In one example approach, the route processing thread 26 transmits the route update information associated with a given BGP peer group to a BGP update thread 27 serving the given BGP peer group. The BGP update thread 27 collects the route update information (90). The BGP update thread that collected the route update information then transmits the collected route update information as a BGP UPDATE message, as detailed below (92).

As noted above, in some examples, BGP update thread 27 constructs each BGP update message to include updates for prefixes having the same outgoing attribute, even if the compact advertisement information is received from two or more route processing threads 26. Such an approach allows a BGP update thread 27 serving a given BGP peer group to pack prefixes having the same attributes (and potentially received from different route processing threads 26) in the same outbound update message.

As noted above, the BGP update thread(s) 27 and/or thread 40 may perform receive and send operations for routing protocol messages. For example, for routing protocol messages that conform to BGP, such operations may include receiving the BGP UPDATE message and sending the BGP UPDATE message.

When network device 12 receives routes in respective routing protocol messages, each of the routes include a network prefix. In one example approach, BGP update thread(s) 27 perform a hash operation for each route, with the network prefix as an input. The network prefix may be input to the hash operation as a string of characters, a bit string, a range, or other input format. The network prefix may include both the prefix and the prefix length. E.g., "1.0.0.0/8," where 1.0.0.0 is the prefix and 8 is the prefix length. The hash operation may be performed on less than the full bit string of the network prefix in some example. Example hash functions used for the hash operation may include SHA1, MD5, and DJB2. In one example approach, the hash operation performed by BGP update thread 27 for a network prefix of a route included in a routing protocol message determines the route processing thread 26 that is to perform route processing operations on the route. An example DJB2 hashing function that receives a network prefix as a character string and returns an integer hash value that indicates a hash bucket corresponding to one of route processing threads 26 is:

```
unsigned long hash(unsigned char*str)
{
unsigned long hash=5381;
int c;
while (c=*str++)
   /*hash*37+c*/hash
   =((hash<<5)+(hash<<2))+c;
return hash;
}
```

As noted above, in one example approach, the hash operation performed by BGP update thread 27 for a network prefix of a route included in a routing protocol message determines the route processing thread 26 that is to perform route processing operations on the route. In effect, the BGP update thread 27 "assigns" the route to the identified route processing thread 26. In one such example approach, once a route processing thread has been identified for a route, the BGP update thread 27 signals the identified route processing thread 26 to perform route processing tasks for the route.

Although BGP update thread 27 may be a single thread that serially performs the assignment task with respect to routes, once BGP update thread 27 has assigned a route and signaled the identified route processing thread 26, the identified route processing thread 26 may assume the appropriate route processing tasks. Because the route processing tasks typically require much longer to complete than the assignment task performed by BGP update thread(s) 27, the techniques may effectively parallelize route processing for routing protocol messages and reduce route processing latency. In addition, the techniques described for packing BGP routes may improve parallelization for route processing within network device 12 by packing prefixes having the same outgoing attributes (potentially belonging to different route processing threads 26) in the same outbound update message. This approach reduces the number of BGP update messages advertised and, thus, helps improve convergence.

Figure 3:
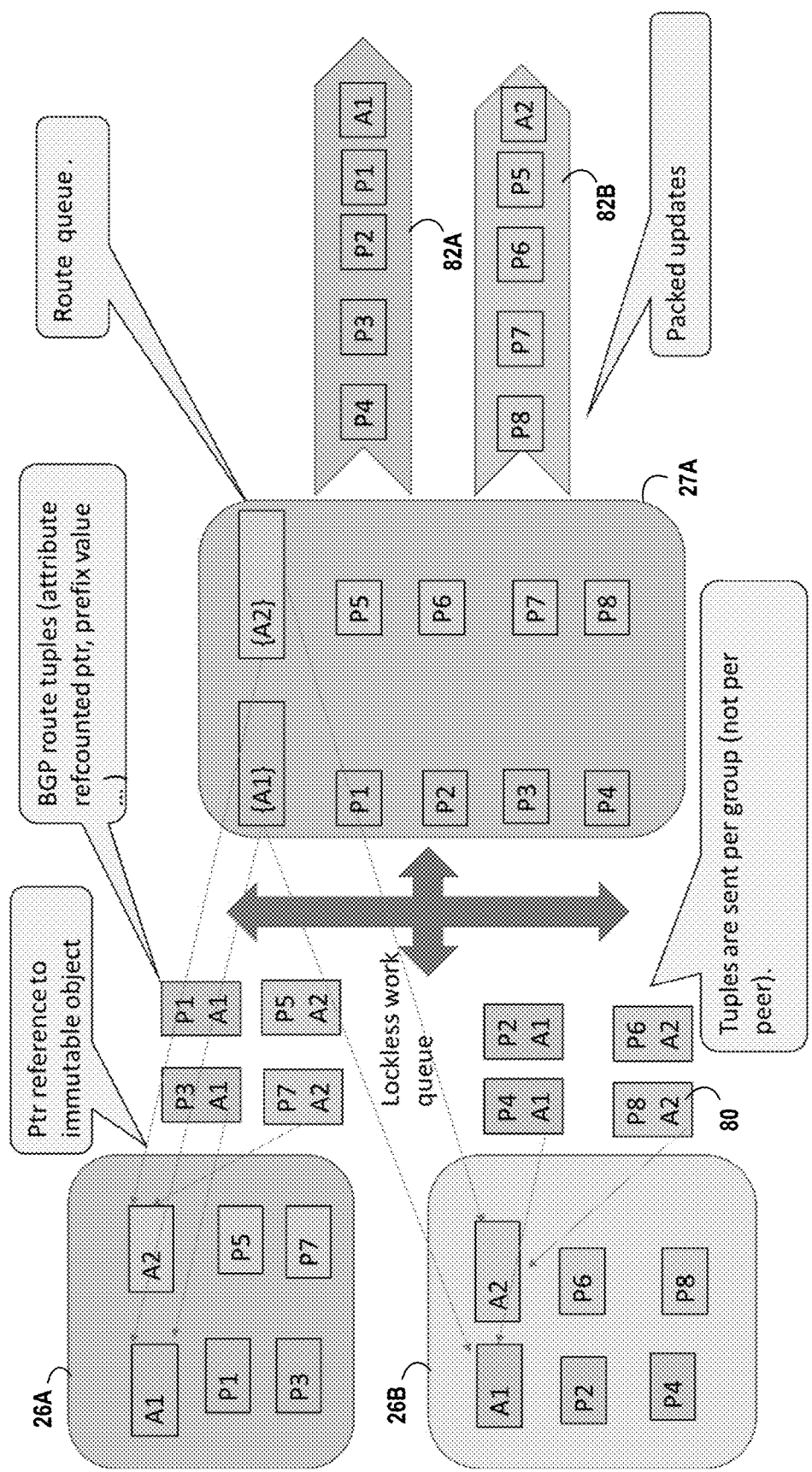
FIG. 3 is a block diagram illustrating an example technique for packing BGP routes within a BGP update message, according to techniques described herein.

FIG. 3 is a block diagram illustrating an example technique for packing BGP routes within a BGP update message, according to techniques described herein. In the example of FIG. 3, a BGP update thread 27A receives compact advertisement information including route update information from route processing threads 26A and 26B. BGP update thread 27A serves one or more BGP peer groups, constructing BGP update messages for the BGP peer groups served by BGP update thread 27A from the compact advertisement information received from route processing threads 26A and 26B.

In one example approach, BGP update thread 27A collects the route update information received from route processing threads 26A and 26B over a period of time and then constructs packed BGP update messages from route update information associated with network prefixes sharing the same outgoing attribute. In some such example approaches, the period of time is programmable. The approach described above allows BGP update thread 27A, the BGP update thread serving the BGP peer groups, to pack prefixes with the same attributes—potentially belonging to different RIB partitions 22—in the same outbound update message, reducing the number of updates to be advertised and thus improving convergence.

It should be noted that BGP path attributes are canonicalized and therefore immutable. BGP path attributes, therefore, are safe for lockless concurrent read access. This allows route processing threads 26 to pass BGP route tuples 80 of (prefix, attribute-ref) to BGP update thread 27A so that BGP update thread 27A may recombine the tuples and pack them into updates. In one example approach, the path attributes themselves may be lazy garbage collected when BGP update thread 27A is done with the references.

BGP protocol implementations include the notion called "peer groups," that combine peers with the same export policy. This approach eases configuration and provides efficiency of implementation (since export policy can be applied per group instead of per peer). There is, however, work involved in generating per peer updates from the group's export policy result. The work of generating updates, however, is entirely independent for each group and self-contained. Update generation can, therefore, be run concurrently in a lockless fashion. A workload that is write-heavy (i.e., generating lot of updates for a large number of peers in a group), will significantly benefit in convergence from this technique. For instance, the approach described above may be used in a route reflector to combine BGP route update information (e.g., prefix, metrics) received from two or more BGP UPDATE messages into a packed BGP UPDATE message that may be transmitted to other routers.

In one example approach, the BGP route tuple 80 carried from the route processing thread 26 toward BGP update thread 27 is a peer group level of information as opposed to a per peer level of information. The use of such tuples demonstrates much better scaling and, hence, performance properties. In fact, the packing performed by BGP update thread 27 may improve performance even without the parallel processing of routes stored in RIB partitions 22, especially in a write-heavy workload case.

In the example shown in FIG. 3, route processing thread 26A and its corresponding RIB partition 22A store routes associated with prefixes P1, P3, P5 and P7. Prefixes P1 and P3 share a first attribute, A1, while prefixes P5 and P7 share a second attribute, A2. At the same time, route processing thread 26B and its corresponding RIB partition 22B store routes associated with prefixes P2, P4, P6 and P7. Prefixes P2 and P4 share the first attribute, A1, while prefixes P6 and P8 share the second attribute, A2. BGP update thread 27A receives route update information for prefixes P1-P8 from resource processing threads 26A and 26B as tuples (P1, A1), (P2, A1), (P3, A1), (P4, A1), (P5, A2), (P5, A2), (P5, A2), (P5, A2) and, as can be seen in FIG. 3, collects prefixes with the attribute A1 in a group separate from a group of prefixes with the attribute A2. BGP update thread 27A then constructs a first BGP update message that packs the route update information of the prefixes of attribute A1 into a single BGP update message 82A and a second BGP update message that packs the route update information of the prefixes of attribute A2 into a single BGP UPDATE message 82B.

In one example, control unit 14 constructs a BGP update message by processing BGP routing protocol messages at each of the route processing threads. In one example, each BGP routing protocol message includes a network prefix. In one example, route processing threads 26 generate compact advertisement information for route updates associated with each network prefix. The compact advertisement information includes a BGP route tuple 80 having a network prefix value and a pointer to an outgoing attribute. The route processing threads 26 send the compact advertisement information to a BGP update thread 27 serving a BGP peer group associated with the routes to be updated. The BGP update thread 27 serving the BGP peer group receives, from two or more of the route processing threads, the compact advertisement information for route updates to be advertised and groups the route update having the same outgoing attribute based on the BGP route tuples 80. The BGP update thread 27 then constructs a BGP update message 82 from the grouped route updates. In the example shown in FIG. 3, BGP update thread 27 constructs a BGP update message 82A for network prefixes having an attribute A1 and a BGP update message 82B for network prefixes having an attribute A2.

As mentioned above, in BGP implementations, path attributes are canonicalized. In addition to memory efficiency, such an approach also enables two metrics to be efficiently compared by reference rather than by value. In a lockless implementation of RIB partitioning, route processing threads 26 generate path attributes (BGP metrics) independently of each other. A BGP update thread 27 that reconciles two metrics from independent RIB partitions 22 cannot, however, compare them by reference and may have to resort to inefficient value comparison. At the same time, a thread may create a local metric to represent metrics from various RIB partitions 22 that have the same value. This enables efficient metrics comparison subsequently.

Well behaved BGP implementation strives to state compress and reduce or eliminate any redundant BGP update messages. The technique described above for combining BGP route update information from two or more routes into a single BGP update message enhances this process by reducing the number of BGP update messages. In addition, it may be useful to apply the technique not only in the BGP update thread (recombining BGP route tuples 80) but also in the sending route processing thread 26. This allows state compression across thread boundaries.

Figure 4:
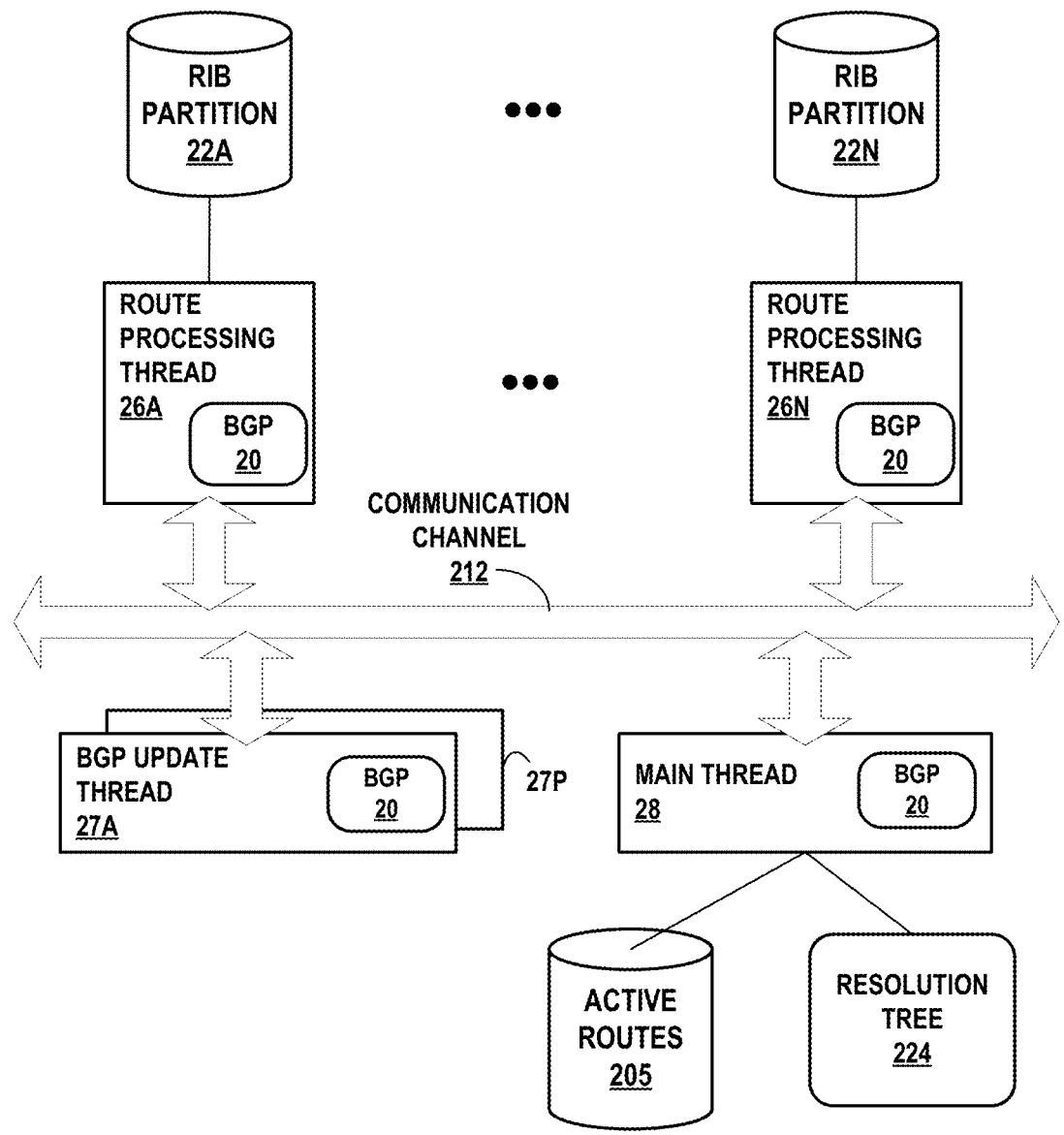
FIG. 4 is a block diagram illustrating an example technique for communicating between threads performing route processing operations, according to techniques described herein.

FIG. 4 is a block diagram illustrating an example technique for communicating between threads performing route processing operations, according to techniques described herein. In one such example approach, route processing threads 26A-26N, BGP update threads 27A-27P, and main thread 28 may communicate using an intra-process, inter-thread communication channel 212. Although referred to as a channel, communication channel 212 may represent any type of inter-thread communication, such as a message bus, message queues, message passing, a file, shared memory or buffer, socket, and so forth.

Each of RIB partitions 22 includes one or more routes stored and managed by a corresponding one of route processing threads 26. Routes stored to RIB partitions 22 may include both active and inactive routes. One or more routes stored to RIB partitions 22 may be associated with resolution information that describes, for instance, a corresponding forwarding next hop of the network device 12 with which to forward packets that travel the route.

Resolution tree 224 maps network prefixes to forwarding next hops of the network device 12 with which network device 12 is to forward matching packets for the network prefixes. Forwarding next hops may represent next hops for an IGP or LSP route required to reach a next hop received in a routing protocol message, e.g., as a NEXT HOP attribute of a BGP UPDATE message. Such next hops are in some cases referred to as primary next hops. Resolution may refer to BGP resolution, route resolution for another distance vector protocol, or other route resolution.

In one example approach, each of route processing threads 26 requests, from main thread 28, resolution of a next hop for a route received in a routing protocol message assigned to the route processing thread 26. In one such example approach, route processing threads 26 request resolution by posting the next hop via communication channel 212 to main thread 28. Route processing threads 26 additionally post respective sets of active routes from RIB partitions 22 to main thread 28, via communication channel 212, which main thread 28 stores to active routes 205. Each posted active route may include a flag indicating whether the route is a supporting route. The main thread 28 maintains resolution tree 224.

If necessary because main thread 28 has not already resolved a next hop, main thread 28 resolves the next hop for which resolution is requested from one of route processing threads 26. Such resolution may generate resolution information for the next hop, e.g., a forwarding next hop for the corresponding route(s) that specify the next hop. Main thread 28 communicates resolution information for the next hop to the requesting one of route processing threads 26, which may store the resolution information to the corresponding RIB partition 22 in association with the routes that specify the next hop. The requesting one of route processing threads 26 may further mark such routes as active. Example algorithms for route resolution are found in U.S. Pat. No. 7,184,437, issued Feb. 27, 2007, which is incorporated by reference herein in its entirety.

In one example approach, route processing threads 26 post information required to construct BGP update messages (i.e., "route update information") to one of the BGP update threads 27 via communication channel 212. In one such example approach, the BGP update thread 27 that receives the route update information required to construct the BGP update message packs the route update information received into a packed BGP update message with route update information having the same outgoing attribute(s) received from the same or other BGP route processing threads 26. In one such example approach, the BGP update thread 27 that receives the information required to construct the BGP update message then transmits the packed BGP update message to other routers (not shown) via, for instance, one of the network interface cards 50 shown in FIG. 1 using communication channel 212.

Figure 5:
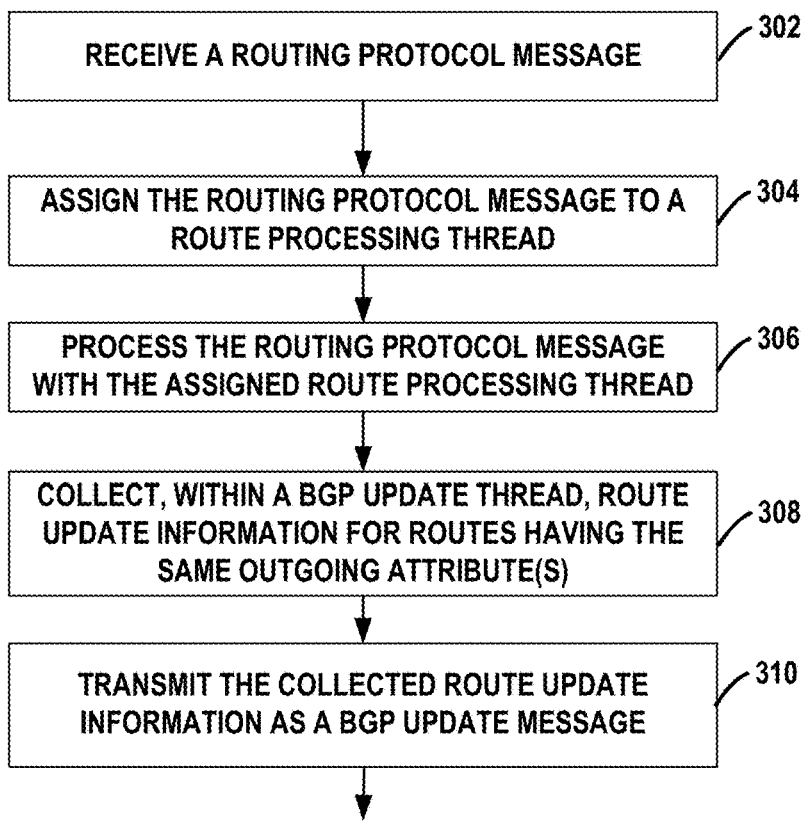
FIG. 5 is a flowchart illustrating an example mode of operation for updating BGP routes, according to techniques of this disclosure.

FIG. 5 is a flowchart illustrating an example mode of operation for updating BGP routes, according to techniques of this disclosure. For purposes of examples, operation 300 is described with respect to FIGS. 1-3. One of BGP update thread(s) 27 detects that network device 12 has received a routing protocol message (302). The BGP update thread 27 reads a network prefix from the routing protocol message and applies a hashing or other selection operation to the network prefix to identify one of a plurality of route processing threads 26 with which to process the routing protocol message; the BGP update thread 27 then notifies the identified route processing thread 26 (304). The identified route processing thread 26 processes the routing protocol message as described above and transmits route update information for the route to one of the BGP update threads 27 (306). The BGP update thread 27 that receives the route update information groups the route update information for the route with route update information from routes having the same outgoing attribute (308). The BGP update thread 27 then transmits the collected route update information to other network devices as a packed BGP UPDATE message (310).

In some example approaches, the identified route processing thread 26 requests, from main thread 28, resolution of a next hop specified for a route included in the routing protocol message. Main thread 28 resolves the next hop to obtain a forwarding next hop and returns the forwarding next hop to the identified route processing thread 26, which stores the forwarding next hop and the associated route to the RIB partition 22 of the identified route processing thread 26.

Route processing threads 26 may post local active routing protocol routes from the routes to the kernel. For example, route processing threads 26 may communicate such routes to a kernel routing table thread for exchanging routes with the kernel routing table, from which operating system 36 may generate FIB 38. At least in some cases, route processing threads 26 may communicate active routes to the kernel routing table concurrently. That is, multiple route processing threads 26 may concurrently download active routes to the kernel routing table.

In some examples, processing the routing protocol message with the identified route processing thread 26 may include performing a path selection task for a new network prefix. Path selection may incorporate routes from protocols other than the routing protocol executed by threads 26, 27 and 28, e.g., routes for IGP 42 and/or MPLS (hereinafter, "IGP/MPLS routes"). When BGP 20 routes overlap with IGP/MPLS routes, for instance, network device 12 may be configured with a preference to advertise the IGP/MPLS routes. Route processing threads 26 may therefore access IGP/MPLS routes stored by an IGP/MPLS routing information base (not shown in FIG. 1) to determine whether a more preferred IGP/MPLS route is available in lieu of a route from respective, corresponding routes 205. In some examples of network device 12, IGP/MPLS routes are distributed and stored among route processing threads 26 in a manner similar to those of the routing protocol 20, as described above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method of constructing Border Gateway Protocol (BGP) updates, the method comprising:
   partitioning a routing information base (RIB) into a plurality of RIB partitions;
   assigning a route processing thread to each RIB partition, respectively, wherein the route processing thread assigned to each RIB partition is a software execution thread of a network device;
   processing BGP routing protocol messages at each of the route processing threads, wherein each BGP routing protocol message includes a network prefix and wherein processing includes generating, at the route processing threads, route update information for each route to be updated in the RIB partition to which the route processing thread is assigned, wherein the route update information includes a BGP route tuple having a network prefix value and a pointer to an outgoing BGP attribute;
   receiving, at a BGP update thread serving a BGP peer group, from two or more of the route processing threads, the route update information for routes to be advertised by the RIB partition to which the respective route processing thread is assigned, the route update information including network prefixes associated with the BGP peer group;
   collecting, at the BGP update thread, based on the BGP route tuples, the route update information received from different RIB partitions for routes having the same outgoing BGP attribute; and
   constructing, at the BGP update thread, a BGP update message from the collected route update information, the BGP update message including route update information for routes from the different RIB partitions but sharing the same outgoing BGP attribute.

2. The method of claim 1, wherein collecting includes collecting route update information received over a predefined period of time.

3. The method of claim 2, wherein the predefined period of time is programmable by a network device user.

4. The method of claim 1, wherein the BGP update thread is a software execution thread of another network device.

5. The method of claim 1, wherein processing BGP routing protocol messages further includes:
   computing, by applying a hashing function to the network prefix of each BGP routing protocol messages, a hash value for each network prefix; and
   assigning each BGP routing protocol message to one of the route processing threads based on the hash value.

6. The method of claim 1, wherein the route processing threads process BGP routing protocol messages concurrently, grouping the route update information for the RIB partition by outgoing BGP attribute before sending the grouped route update information to the BGP update thread.

7. The method of claim 1, wherein processing BGP routing protocol messages further includes one or more of parsing a routing protocol message, generating a route from the routing protocol message, and resolving a next hop for the route from the routing protocol message.

8. The method of claim 1, wherein processing BGP routing protocol messages further includes:
   generating a route from the routing protocol message; and
   storing the route to the RIB partition of the route processing thread generating the route.

9. The method of claim 8, wherein processing BGP routing protocol messages further includes storing the route to a kernel routing table.

10. The method of claim 1, the method further comprising transmitting the BGP update message.

11. The method of claim 1, wherein processing BGP routing protocol messages further includes:
    applying a bit pattern to bits of the network prefix of each routing protocol message to obtain a value; and
    assigning each BGP routing protocol message to the route processing thread indicated by the value.

12. A network device comprising:
    a network interface card; and
    at least one hardware-based processor comprising a plurality of processing cores for executing a plurality of execution threads for at least one routing protocol process, the at least one hardware-based processor configured to:
    partition a routing information base (RIB) into a plurality of RIB partitions;
    assign a route processing thread to each RIB partition of the plurality of RIB partitions, respectively, wherein the route processing thread assigned to each RIB partition is a software execution thread of one of the at least one hardware-based processors;

process Border Gateway Protocol (BGP) routing protocol messages at each of the route processing threads, wherein each BGP routing protocol message includes a network prefix and wherein processing includes generating, at the route processing threads, route update information for routes to be updated in the RIB partition to which the route processing thread is assigned, wherein the route update information includes a BGP route tuple having a network prefix value and a pointer to an outgoing BGP attribute;

receive, at a BGP update thread serving a BGP peer group, from two or more of the route processing threads, the route update information for routes to be advertised by the RIB partition to which the respective route processing thread is assigned, the route update information including network prefixes associated with the BGP peer group;

collect, at the BGP update thread, based on the BGP route tuples, route update information received from different RIB partitions for routes having the same outgoing BGP attribute; and construct, at the BGP update thread, a BGP update message from the collected route update information, the BGP update message including route update information for routes from the different RIB partitions but sharing the same outgoing BGP attribute.

13. The network device of claim 12, wherein processing BGP routing protocol messages further includes:

computing, by applying a hashing function to the network prefix of each BGP routing protocol messages, a hash value for each network prefix; and assigning each BGP routing protocol message to one of the route processing threads based on the hash value.

14. The network device of claim 12, wherein the BGP update thread is a software execution thread of one of the at least one hardware-based processors.

15. The network device of claim 12, wherein the at least one hardware-based processor is further configured to transmit the BGP UPDATE message to one or more other network devices.

16. The network device of claim 12, wherein the at least one hardware-based processor is further configured to:

generate a route from the routing protocol message; and store the route to the RIB partition of the route processing thread generating the route.

17. The network device of claim 12, wherein the at least one hardware-based processor is further configured to store the route to a kernel routing table.

18. A non-transitory computer-readable medium comprising instructions that, when executed, cause one or more hardware-based processors of one or more network devices to perform operations comprising:

partitioning a routing information base (RIB) into a plurality of RIB partitions;

assigning a route processing thread to each RIB partition of the plurality of RIB partitions, respectively, wherein the route processing thread assigned to each RIB partition is a software execution thread of one or more of the hardware-based processors of the one or more network devices;

processing Border Gateway Protocol (BGP) routing protocol messages at each of the route processing threads, wherein each BGP routing protocol message includes a network prefix and wherein processing includes generating, at the route processing threads, route update information for each route to be updated in the RIB partition to which the route processing thread is assigned, wherein the route update information includes a BGP route tuple having a network prefix value and a pointer to an outgoing BGP attribute;

receiving, at a BGP update thread serving a BGP peer group, from two or more of the route processing threads, the route update information for routes to be advertised by the RIB partition to which the respective route processing thread is assigned, the route update information including network prefixes associated with the BGP peer group;

collecting, at the BGP update thread, based on the BGP route tuples, the route update information received from different RIB partitions for routes having the same outgoing BGP attribute; and constructing, at the BGP update thread, a BGP update message from the collected route update information, the BGP update message including route update information for routes from the different RIB partitions but sharing the same outgoing BGP attribute.

19. The computer-readable medium of claim 18, wherein processing BGP routing protocol messages further includes:

computing, by applying a hashing function to the network prefix of each BGP routing protocol messages, a hash value for each network prefix; and assigning each BGP routing protocol message to one of the route processing threads based on the hash value.

20. The computer-readable medium of claim 18, wherein the at least one hardware-based processor is further configured to transmit the BGP UPDATE message.

* * * * *